(12) United States Patent
Johnson

(10) Patent No.: US 8,233,880 B2
(45) Date of Patent: Jul. 31, 2012

(54) INTEGRATION OF CELLULAR PHONE DETECTION AND REPORTING INTO A PRISON TELEPHONE SYSTEM

(75) Inventor: Garth Johnson, Indianapolis, IN (US)

(73) Assignee: **Global Tel*Link Corporation**, Mobile, AL (US)

( * ) Notice: Subject to any disclaimer, the term of this patent is extended or adjusted under 35 U.S.C. 154(b) by 1137 days.

(21) Appl. No.: 11/504,979

(22) Filed: Aug. 16, 2006

(65) Prior Publication Data
US 2008/0043993 A1    Feb. 21, 2008

(51) Int. Cl.
*M04M 1/66* (2006.01)

(52) U.S. Cl. ............ 455/410; 455/411; 379/189; 726/2

(58) Field of Classification Search ............... 455/404.1, 455/404.2, 421, 9, 67.11, 412.1, 405, 414.1–414.4, 455/456.1–456.6, 466, 422.1, 429, 443, 444, 455/446, 560, 561, 565, 567, 2, 426.1, 426.2, 455/462, 465, 554.1, 554.2, 555; 379/88.12, 379/1.02, 7, 32.01–35, 38–42, 68, 70–75, 379/85, 100.3, 100.05, 112.01, 114.06, 189; 726/1–36
See application file for complete search history.

(56) References Cited

U.S. PATENT DOCUMENTS

| | | | | |
|---|---|---|---|---|
| 5,940,764 | A * | 8/1999 | Mikami | 455/456.6 |
| 6,201,973 | B1 * | 3/2001 | Kowaguchi | 455/456.6 |
| 6,799,052 | B2 | 9/2004 | Agness et al. | |
| 2001/0036821 | A1 * | 11/2001 | Gainsboro et al. | 455/410 |
| 2002/0094780 | A1 * | 7/2002 | Payton et al. | 455/41 |
| 2003/0143943 | A1 | 7/2003 | Kline | |

OTHER PUBLICATIONS

Cellbuster Cell Phone Detector, Cellbusters Mobile Security Products, Cellbusters.Com, Phoenix, Arizona.
GSM Pocket Cellular Phone Detector, www.cellular.co.za.
"No More 'Cell' Phones", TECHbeat, Winter 2005.
"Controlling Wireless Abuse in Restricted Areas", Cell Block Technologies, Inc., www.cell-block-r.com, Prison Review International, Apr. 2002.
GSM Pocket Cellular Phone Detector, www.cellular.co.za, 2005.

* cited by examiner

*Primary Examiner* — Kent Chang
*Assistant Examiner* — San Htun
(74) *Attorney, Agent, or Firm* — Sterne, Kessler, Goldstein & Fox p.l.l.c.

(57) ABSTRACT

The present subject matter is directed to an apparatus and methodology for monitoring for the occurrence of use of unauthorized telecommunications equipment within a designated area. The present subject matter has particular utility to the corrections environment in that it discloses a methodology for detecting and reporting the unauthorized operation of cellular telephones within a corrections facility. The present technology may be used advantageously in combination with inmate telephone systems to transmit information to appropriate personnel in the form of email messages and/or voice communications by way of telephone local or corrections facility external telephone lines. The present technology also provides for recordation and storage of time, date and location information for detected events.

18 Claims, 1 Drawing Sheet

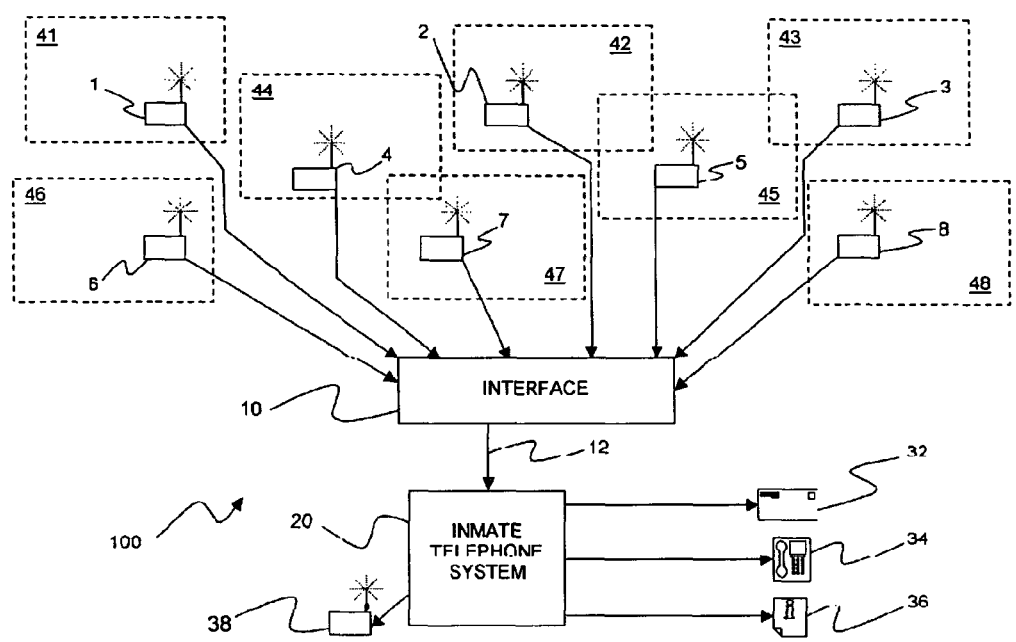

INTEGRATION OF CELLULAR PHONE DETECTION AND REPORTING INTO A PRISON TELEPHONE SYSTEM

BACKGROUND OF THE INVENTION

The present subject matter relates generally to a method and apparatus for detecting reporting the operation of cellular telephones within selected or predetermined areas. More particularly, the present subject matter relates to a method and apparatus for detecting the unauthorized operation of cellular telephones within security facilities including prisons and reporting such operation to selected officials.

The present subject matter is directed in one aspect, although not exclusively, towards the corrections environment. Various law enforcement entities find it desirable, even necessary (for example, such as required by law or circumstances), to monitor telephone conversations conducted by inmates in penal institutions or other detainees in similar facilities. Highly specialized telecommunications equipment and facilities must be provided to meet the various needs of governmental officials and others in addressing the desire to monitor and/or record telephone conversations under varying circumstances.

As telephone technology and, in particular, cellular technology, has become more advanced, workers in the corrections environment have found that it has become easier to hide and smuggle into corrections facilities very small cellular telephones that may be used by inmate and others to circumvent the required monitoring and/or recording operations. As a non-limiting example, the remainder of the present disclosure will refer to monitoring for cellular telephone activity within the above noted particular environment. It is to be strictly understood, however, that the present technology may be applied to and/or used within other areas where monitoring of cellular telephone activity may be of interest. For example, it may be desirable, for security or other purposes, to monitor cellular telephone activity in business or governmental environments where confidential or classified information is being discussed. Alternatively, there could be an interest in monitoring cellular telephone activity where operation of such devices is restricted or, for courtesy, deemed undesirable such as in restaurants, places of worship, theaters and similar locations. As such, it should be understood that the present technology has applicability to any situation where there is a need or desire to monitor cellular telephone activity within a prescribed area.

It has been common practice for many years in the corrections environment to record and/or monitor inmates' conversations. Such recording and monitoring takes place in the very controlled atmosphere of permitted inmate communications with individuals outside of the facilities housing prisoners or inmates. Normally prisoners are limited to a small number of individuals that they are permitted to call. These may include family members, their lawyers, and friends and may specifically exclude others, for example judges, jury members, witnesses, former co-conspirators and other like individuals to whom calls from a particular inmate may be of a harassing or other undesired nature. There may be time of day, length of call, three-way call or other restrictions on calls, all of which must be controlled by way of various instrumentalities that may include computer controlled equipment at the facility and/or at remote locations in addition to human monitoring and/or control. In almost all instances, such telephone calls must be recorded; yet even in those instances, there are conditions that may impact on the desire, ability, or legal right to record such conversations. For example, it is inappropriate to record or monitor conversations between an inmate and his/her attorney, and thus, measures must be taken to insure that, where calls are made from an inmate to his/her attorney, no recording is made or monitoring is allowed.

The particular needs described above have been addressed in the prior art, which, in major part, has provided responses to accommodate the majority of the needs addressed. Examples of such include LazerPhone™ and LazerVoice®, products provided by the assignee of the present subject matter. LazerPhone™ is a centralized, PC-based, integrated telephone system with features that provide control of inmate telecommunications activities. The system provides call blocking and monitoring, account control including personal identification number (PIN) setup and control, report generation including automated trouble reports, call activity reports and other administrative reports as well as numerous other features.

LazerVoice® is an optional feature of LazerPhone™ and provides a recording function for the LazerPhone™ system. LazerVoice® is a modular system that provides the ability to record at its installation site selected telephone conversations, permit monitoring by appropriate authorities of selected conversations, and store for later retrieval recorded conversations as well as other functions and operations involving the recording of telephone conversations. Additional information regarding these products may be found at the World Wide Web site, www.gtl.us, of the corporate owner of the present application interests.

While it is considered well known that the recording of inmate telephone conversations is advantageous to governmental agencies and appropriate authorities in that information regarding the security of facilities and general continuing or past criminal activity may be found in such recordings, advances in the cellular telephone technology have opened avenues for inmates to circumvent such monitoring and/or recording advantages. Maintaining the ability to insure control and/or monitoring of communications from or to a controlled facility is, therefore, an important aspect to previously implemented telecommunications systems. As noted, with the advances in cellular communications technology, such maintenance of capability is hindered by such issues as the clandestine delivery of prohibited equipment into a monitored facility. Due to the small size of certain of the more recently developed devices, such may avoid detection by more conventional search techniques including, but not limited to, walk through and manual metal detectors and even physical "pat-down" searches.

While various aspects and alternative features are known in the field of telecommunications and telephone conversation monitoring, no one design has emerged that generally integrates all of the ideal features and performance characteristics as discussed herein.

SUMMARY OF THE INVENTION

The present subject matter recognizes and addresses several of the foregoing shortcomings, and others concerning certain aspects of monitoring telephone conversations within a corrections environment.

Thus, broadly speaking, aspects of some embodiments of the presently disclosed technology concern the provision of improved apparatus and corresponding methodology to provide for the continued monitoring of telephone conversation(s) between individuals within a corrections facility and called or calling parties outside such facilities. More particularly, certain aspects of some embodiments of the disclosed technology relate to an improved apparatus and corresponding methodology using radio frequency (RF) monitoring device(s), the provision and practice of which will help insure that any telephone conversations made from or to a corrections facility will have the maximum possible availability to authorized personnel.

Another aspect of certain embodiments of the present subject matter is to provide an improved apparatus and corresponding methodology that provides simple integration with existing corrections facilities telephone systems or, alternately, a significant option for new corrections facilities telephone system installations.

A further aspect of certain embodiments of the present subject matter is to provide an improved apparatus and corresponding methodology for conveniently notifying appropriate personnel of the operation of unauthorized telephone equipment within a corrections facility.

A still further aspect of certain embodiments of the present subject matter is to provide an improved apparatus and corresponding methodology for locating unauthorized telephone equipment within a corrections facility.

Additional aspects and advantages of the present subject matter are set forth in or will be apparent to those of ordinary skill in the art from the detailed description herein. Also, it should be further appreciated by those of ordinary skill in the art that modifications and variations to the specifically illustrated, referenced, and discussed features and steps hereof may be practiced in various embodiments and uses of this subject matter without departing from the spirit and scope thereof, by virtue of present reference thereto. Such variations may include, but are not limited to, substitution of equivalent means and features, materials, or steps for those shown, referenced, or discussed, and the functional, operational, or positional reversal of various parts, features, steps, or the like.

Still further, it is to be understood that different embodiments, as well as different presently preferred embodiments, of this subject matter may include various combinations or configurations of presently disclosed features, steps, or elements, or their equivalents (including combinations of features or steps or configurations thereof not expressly shown in the figure or stated in the detailed description).

A first exemplary embodiment of the present subject matter relates to an improved apparatus and corresponding methodology for monitoring for the presence of cellular telephones within a defined area.

Another exemplary embodiment of the present subject matter relates to an improved apparatus and corresponding methodology for automatically generating reports of violations of cellular telephone use regulations.

A more particular exemplary embodiment of the present technology relates to an improved apparatus and corresponding methodology for automatically notifying authorized personnel in real time of the operation of unauthorized communications equipment within a prescribed area.

Still another particular exemplary embodiment of the present subject matter involves a specialized phone system for use in relation to a prison environment, having an associated sensor system responsive to the operation of selected telecommunications apparatus. Such a system may include one or more cellular telephone detector(s) located at selected or predetermined location(s) within a corrections facility; an interface device, an inmate telephone system, and one or more report or alarm delivering devices. With such system, advantageously inmates will not be able to circumvent monitoring and/or recording of conversation data from inmate conversations conducted by way of unauthorized telephone instruments surreptitiously brought into the corrections facility.

Yet another present exemplary embodiment may relate to a cellular telephone detection system, comprising: a plurality of cellular telephone transmission detectors, an interface device, and a telephone system. In such present exemplary cellular telephone detection system, each such detector is preferably operatively associated with a predetermined zone and configured to produce a detection signal upon detection of cellular telephone transmissions within its respective predetermined zone. Such exemplary interface device is preferably coupled to each of the plurality of cellular telephone transmission detectors; and the exemplary telephone system is preferably coupled to such interface device, and otherwise configured to receive one or more detection signals from one or more of the plurality of cellular telephone transmission detectors and to generate one or more notification messages indicative of detected cellular telephone transmissions.

Present subject matter may likewise encompass a corresponding method for monitoring an area for cellular telephone transmissions.

Still further, present exemplary embodiments may relate to an inmate telephone system, comprising a plurality of cellular telephone transmission detectors, each detector operatively associated with a predetermined zone and configured to produce a detection signal upon detection of cellular telephone transmissions within its respective predetermined zone; and a telephone system. Such exemplary telephone system preferably is coupled to the plurality of cellular telephone transmission detectors, and configured to receive one or more detection signals from one or more of the plurality of cellular telephone transmission detectors and to generate one or more notification messages indicative of detected cellular telephone transmissions.

Additional embodiments of the subject technology, not necessarily expressed in this summarized section, may include and incorporate various combinations of aspects of features, parts, or steps referenced in the summarized objectives above, and/or features, parts, or steps as otherwise discussed in this application.

Those of ordinary skill in the art will better appreciate the features and aspects of such embodiments, and others, upon review of the remainder of the specification.

BRIEF DESCRIPTION OF THE DRAWING

A full and enabling description of the present subject matter, including the best mode thereof, directed to one of ordinary skill in the art, is set forth in the specification, which makes reference to the appended figure, in which:

FIG. 1 is a generally representational block diagram illustrating an overview of the present subject matter.

Repeat use of reference characters throughout the present specification and appended drawing is intended to represent same or analogous features or elements of the present subject matter.

DETAILED DESCRIPTION OF THE DRAWING

As referenced in the Summary of the Invention section, supra, the present subject matter is directed towards an improved apparatus and corresponding methodology for monitoring for the unauthorized use of cellular telecommunications equipment within designated areas.

Reference will now be made to the presently disclosed technology, specifically with reference to FIG. 1. It will be observed from FIG. 1 that the present technology is directed to apparatus and a methodology for monitoring for the unauthorized use of certain types of telecommunications equipment within designated areas. The present subject matter is primarily directed to the detection of the unauthorized presence and/or use of cellular telephones. It should be borne in mine, however, that the present subject matter is not so limited in that the present subject matter may be used to detect the use of other types of unauthorized communications equipment including, for example text messaging devices, two-way pagers, and other types of radio frequency transmitting and/or devices that may be used to transmit and/or receive messages to or from a corrections facility.

With further reference to FIG. 1 it will be observed that there is illustrated a block diagram of a cellular telephone detection system 100 incorporated with an inmate telephone system. As mentioned earlier hereinabove, inmate telephone systems provide a number of features that may be used to assist law enforcement personnel in carrying out their obligations to monitor and/or record communications to and from inmates in a correctional facility. Such system are readily available from several sources including the assignee of the present subject matter. The present subject matter relates to optional capability of such known systems in the form of a plurality of specially designed detectors that, when combined with known inmate telephone systems and, in particular, those of the present assignee, provide operational benefits that, in the aggregate, provide superior capabilities that simply installing a cell phone monitor in selected or predetermined locations.

With further reference to FIG. 1, it will be appreciated that there is illustrated a number of monitoring devices 1-8, each of which may be placed in a cellblock within a corrections facility or in some other appropriate location within the corrections facility including conference rooms, recreational areas, libraries, medical facilities, or other locations within the correctional facility. Each such possible location may be identified as a "zone" and designated with a zone number 41-48 corresponding to monitoring devices 1-8.

Monitoring devices 1-8 may be coupled by way of individual cables to an interface device 10 which is configured to couple signals by way of coupling cable 12 to an inmate telephone system 20. It should be appreciated that other connection methodologies may be employed to couple the monitoring devices 1-8 to interface 10 including optical coupling as, for example, with an optical waveguide corresponding to an optical cable, or by other communications methodologies including, but not limited to radio frequency (RF) techniques including, but again not limited to, Bluetooth®, WiFi, dedicated RF transmission systems, and other wired or wireless technologies. Interface device 10 may be configure to receive a signal form individual monitoring devices 1-8 and to provide information to inmate telephone system 20 that, first, a signal has been detected by a monitoring device and, second, the location of the monitoring device from which the signal was detected.

Information as to location of the various monitoring devices 1-8 may be a part of a data stream sent from the device itself that also includes monitoring activity signals, or may be added to monitoring activity signals received from individual monitoring devices based on pre-established information recorded or entered into the interface device at the time of installation of the monitor devices 1-8 as well as the interface device 10. Alternatively, location information may be recorded within the inmate telephone system 20 itself as, for example, a look-up chart in a memory or file contained within, or as a part of, the inmate telephone system 20.

Regardless of the methodology by which information is conveyed from the detection devices 1-8 and/or interface device 10, such information may be supplied to inmate telephone system 20 in a form corresponding to date and time of detection as well as zone in which, or device from which, a signal has been detected. Upon receipt of the detection information, telephone system 20 may be configured to respond in one or more selected ways. As will be appreciated by those of ordinary skill in the prison telephone system art, prison telephone systems and in particular those available from the assignee of the present subject matter, may be configure to respond in various manners upon detection of specific telephone related events. Such may include the attempted initiation of a call by an inmate to an unauthorized called party or even the utterance of selected words indicative or prohibited activities. In such instances pre-selected communications may automatically be initiated to alert appropriate personnel to the occurrence of a potentially relevant event.

In a similar manner, the technology of the present subject matter allows a user to designate selected responses to the detection of unauthorized telecommunication equipment by providing selected alarms or notification messages to appropriate personnel by way of the inmate telephone system 20. In accordance with the present technology, upon detection of operation of unauthorized telecommunication equipment, signals are sent from one or more detector devices 1-8 in corresponding detection zones 41-48 by way of interface device 10 to inmate telephone system 20.

Inmate telephone system 20 may have been previously configured to respond by sending or generating notification messages corresponding to any combination of emails 32, telephone messages 34 and or information reports 36 to appropriate personnel and/or information storage systems. For purposes of the present disclosure, email may include any form of non-verbal electronic communication including standard email as well as text messages and instant messages, all of which may be transmitted by any available communications channel including those provided by both wired and wireless transmission technologies. Telephone messages 34 may include pre-recorded voice messages or any form of automated audible communications included simulated voice announcements as well as encoded tones or other human perceptible sounds.

It should be appreciated that the chosen responses or combinations of responses generated or sent by inmate telephone system 20 may be reconfigured from time to time as necessary or desirable. It should further be appreciated that emails 32 may be sent to locations within as well as outside of the correctional facility. In addition, telephone messages 34 may take the form of automated voice messages conveying selected information to personnel both inside as well as outside the corrections facility. Such information may convey only that a detection of unauthorized telecommunications equipments has been made so as to alert appropriate personnel to take appropriate actions, or may include any or all collected information including location or zone from which the detection of unauthorized use has occurred as well as date and time information if desired. Finally, an information log or file 36 may be created for current or future uses as desired.

In certain additional, though generally limited, circumstances, it may be desirable for the inmate telephone system to be configured for controlling and activating jamming technology, as generally represented by jammer device 38. For example, in a hostage situation, or in riot conditions, it may be authorized and desirable for the non-authorized use of cell phones to be jammed. In those instances, an appropriately configured inmate telephone system 20 in accordance with the present subject matter, could activate and appropriately control representative jammer device 38.

The present technology is designed primarily to detect unauthorized operation of telecommunication equipment within one or more detection zones based on the detection capabilities of the detector device 1-8. It is contemplated that such detection devices may incorporate sensitivity adjustment means that may include, but are not limited to; signal level comparators, antenna sensitivity adjustment means, as well as other signal discriminating methodologies to provide a measure of adjustability to individual detection zones.

In certain alternatives, it may be desired to have the subject detector devices 1-8 be capable of also detecting non-cellular two-way communication devices (for example, two-way radios, such as used by guards). However, in those instances, in may further be desired and within the present subject matter that the resulting system is provided so as to be selectively responsive to such non-cellular based communications devices, depending on particular needs in a given circumstance.

It should be noted that while the principle concept according to the present technology is to limit detection to a particular zone of detection by the above enumerated methodologies, the present subject matter may incorporate triangulation features based on relative signal levels within monitored zones. Such triangulation methodologies would then include an indication of detected signal level within a detection zone which information may also be sent to inmate telephone system 20 for analysis. The preferred detection method, however, is a zone detection method wherein even if a single unauthorized piece of telecommunications equipment triggers plural zone detections, all such zones will "report in" to the inmate telephone system 20 which would then generate plural indications of unauthorized operation of telecommunications equipment.

As may be observed from an inspection of FIG. 1, certain of the detection zones 41-48 may partially overlap other of the detection zones, while others of the detection zones may not be overlapped. For instance, detection zones 41, 46, and 48 are independent detection zones while zones 44 and 47 partially overlap and zone 45 partially overlaps both zones 42 and 43. Should a signal be detected from any of the detection zones, each zone may then be investigated by appropriate personnel as necessary or required. Such multiple reporting provides a far simpler and, possibly, more reliable detection system than having to rely on triangulation methodologies involving signal levels that may be adversely affected by a great variety of signal absorbing entities including not only permanent elements including building structure but also indeterminate elements including numbers of individuals within a specific area.

Thus there has been described an apparatus and methodology for detecting operation of unauthorized telecommunication equipment in designated locations. Moreover the disclosed apparatus and methodology permits selected communication of such detection to appropriate personnel in selected ways in real time so that appropriate responses may be made.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A cellular telephone detection system for detecting unauthorized cellular telephone usage within predetermined zones within a facility, comprising:
   a plurality of cellular telephone transmission detectors, each detector operatively associated with a predetermined zone within a facility and configured to produce a detection signal upon detection of cellular telephone transmissions within its respective predetermined zone;
   an interface device coupled to each of said plurality of cellular telephone transmission detectors; and
   a telephone system coupled to said interface device, wherein said telephone system is configured to receive one or more detection signals from one or more of said plurality of cellular telephone transmission detectors and to generate one or more notification messages indicative of detected cellular telephone transmissions;
   wherein the notification messages comprise an identification of each detected cellular telephone transmission within its respective predetermined zone within the facility, the date and time of transmission detection, and location information identifying the respective predetermined zone within the facility in which each cellular telephone transmission was detected;
   wherein the notification messages are relayed to authorized personnel of the operation of unauthorized cellular telephone usage within the predetermined zone within the facility; and
   wherein one or more of said cellular telephone transmission detectors are positioned within a facility such that their respective detection zones at least partially overlap the respective detection zone of at least one other of said plurality of cellular telephone transmission detectors.

2. A cellular telephone detection system as in claim 1, wherein said telephone system is configured to generate one or more notification messages in a format selected from the group consisting of email messages, telephonic voice messages, and information records.

3. A cellular telephone detection system as in claim 2, wherein said one or more notification messages further include an indication of detected signal level when each cellular telephone level is detected in a respective detection zone.

4. A cellular telephone detection system as in claim 1, wherein said location information is supplied based on data stored in said interface device.

5. A cellular telephone detection system as in claim 1, wherein said location information is supplied based on data stored in said telephone system.

6. A method for monitoring one or more areas within a facility for unauthorized cellular telephone transmissions therein, comprising the steps of:
   providing a plurality of cellular telephone transmission detectors, with each detector configured to produce a detection signal upon detection of cellular telephone transmissions;
   positioning the plurality of cellular telephone transmission detectors in a respective corresponding plurality of predetermined zones within a facility to be monitored;
   coupling each of said plurality of cellular telephone transmission detectors to an interface device;
   coupling the interface device to a telephone system; and
   configuring the telephone system to produce notification messages for relay to authorized personnel of the operation of unauthorized cellular telephone usage within one or more of the predetermined zones within the facility upon detection of cellular telephone transmissions by one or more of said cellular telephone transmission detectors, said notification messages specifically comprising an identification of each detected cellular telephone transmission within its respective predetermined zone within the facility and location information identifying the respective predetermined zone within the facility in which each cellular telephone transmission was detected; and wherein the step of positioning comprises positioning one or more of the cellular telephone transmission detectors such that their respective detection zones at least partially overlap the respective detection zone of at least one other of said plurality of cellular telephone transmission detectors.

7. The method of claim 6, further comprising the step of configuring said telephone system to generate one or more notification messages in a format selected from the group consisting of email messages, telephonic voice messages, and information records.

8. The method of claim 7, wherein the step of configuring said telephone system to generate one or more notification messages comprises configuring said telephone system to generate one or more notification messages including an indication of detected signal level when each cellular telephone level is detected in a respective detection zone.

9. The method of claim 8, further comprising the step of configuring the interface device to supply cellular telephone transmission detector location information for said notification messages.

10. The method of claim 8, further comprising the step of configuring the telephone system to supply cellular telephone transmission detector location information for said notification messages.

11. An inmate telephone system for detecting unauthorized cellular telephone usage within a corrections facility, comprising;

a plurality of cellular telephone transmission detectors, each detector operatively associated with a predetermined zone within a corrections facility and configured to produce a detection signal upon detection of cellular telephone transmissions within its respective predetermined zone; and a telephone system coupled to said plurality of cellular telephone transmission detectors, wherein said telephone system is configured to receive one or more detection signals from one or more of said plurality of cellular telephone transmission detectors and to generate one or more notification messages indicative of detected cellular telephone transmissions, said one or more notification messages specifically comprising an identification of each detected cellular telephone transmission within its respective predetermined zone, the date and time of transmission detection, and location information identifying the respective predetermined zone within the corrections facility in which each cellular telephone transmission was detected; and wherein one or more of said cellular telephone transmission detectors are positioned such that their respective detection zones within the corrections facility at least partially overlap the respective detection zone of at least one other of said plurality of cellular telephone transmission detectors.

12. An inmate telephone system as in claim 11, wherein said telephone system is configured to generate one or more notification messages in a format selected from the group consisting of email messages, telephonic voice messages, and information records.

13. An inmate telephone system as in claim 12, wherein said one or more notification messages further include an indication of detected signal level when each cellular telephone level is detected in a respective detection zone.

14. An inmate telephone system as in claim 13, further comprising an interface device coupled to each of said plurality of cellular telephone transmission detectors, and coupled to said telephone system.

15. An inmate telephone system as in claim 14, wherein said location information is supplied based on data stored in said interface device.

16. An inmate telephone system as in claim 12, wherein said location information is supplied based on data stored in said telephone system.

17. An inmate telephone system as in claim 11, wherein said telephone system further includes at least one jamming device, and wherein said telephone system is configured to receive one or more of said detection signals from one or more of said plurality of cellular telephone transmission detectors, and to activate and control said jamming device in response thereto.

18. An inmate telephone system as in claim 11, wherein said telephone system further includes a plurality of non-cellular two-way communication detector devices, each such non-cellular two-way communication detector device operatively associated with a predetermined zone and configured to produce a detection signal upon detection of non-cellular two-way transmissions within its respective predetermined zone.

* * * * *